US007259881B2

(12) United States Patent
Nguyen et al.

(10) Patent No.: US 7,259,881 B2
(45) Date of Patent: Aug. 21, 2007

(54) METHOD OF MONITORING MULTIPLE CONTROLLER FAMILIES

(75) Inventors: Truc D. Nguyen, San Diego, CA (US); Sheng Lee, Irvine, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 743 days.

(21) Appl. No.: 09/970,130

(22) Filed: Oct. 3, 2001

(65) Prior Publication Data

US 2003/0063310 A1    Apr. 3, 2003

(51) Int. Cl.
    *G06F 15/16*    (2006.01)
(52) U.S. Cl. .................. 358/1.15; 358/1.12; 358/1.13; 358/1.14; 358/1.16; 709/203; 709/206; 709/207; 709/230; 710/19; 710/63; 710/64; 710/268
(58) Field of Classification Search ............... 358/1.15, 358/1.12, 1.16, 1.13, 1.14; 709/230, 203, 709/206, 207; 710/19, 63, 64, 268
See application file for complete search history.

(56) References Cited

U.S. PATENT DOCUMENTS

| | | | |
|---|---|---|---|
| 5,040,031 A | 8/1991 | Hayashi | |
| 5,386,271 A * | 1/1995 | Maekawa et al. ............... | 399/8 |
| 5,465,364 A | 11/1995 | Lathrop et al. | |
| 5,504,568 A | 4/1996 | Saraswat et al. | |
| 5,537,550 A | 7/1996 | Russell et al. | |
| 5,537,626 A | 7/1996 | Kraslavsky et al. | |
| 5,612,160 A | 3/1997 | Inoue et al. | |
| 5,619,649 A | 4/1997 | Kovnat et al. | |
| 5,659,795 A | 8/1997 | Duvall et al. | |
| 5,694,618 A | 12/1997 | Hibino | |
| 5,761,396 A | 6/1998 | Austin et al. | |
| 5,805,924 A | 9/1998 | Stoevhase | |
| 5,852,744 A | 12/1998 | Agatone et al. | |
| 5,859,711 A | 1/1999 | Barry et al. | |
| 5,867,633 A | 2/1999 | Taylor, III et al. | |
| 5,873,659 A | 2/1999 | Edwards et al. | |
| 5,903,801 A | 5/1999 | Nakamura | |
| 5,943,503 A | 8/1999 | Kai | |
| 5,946,458 A | 8/1999 | Austin et al. | |
| 5,960,167 A | 9/1999 | Roberts et al. | |
| 5,995,721 A * | 11/1999 | Rourke et al. ............. | 358/1.15 |
| 6,006,281 A | 12/1999 | Edmunds | |
| 6,020,973 A * | 2/2000 | Levine et al. ............... | 358/1.15 |
| 6,043,898 A * | 3/2000 | Jacobs ........................ | 358/1.15 |
| 6,073,197 A | 6/2000 | Stewart | |
| 6,076,120 A | 6/2000 | Hatayama | |
| 6,078,406 A | 6/2000 | Nickerson | |
| 6,128,673 A | 10/2000 | Aronson et al. | |
| 6,141,701 A | 10/2000 | Whitney | |
| 6,172,761 B1 | 1/2001 | Ohtani | |

(Continued)

*Primary Examiner*—Aung S. Moe
*Assistant Examiner*—Jacob P. Rohwer
(74) *Attorney, Agent, or Firm*—Tucker Ellis & West LLP

(57) ABSTRACT

A method is disclosed including the steps of submitting a print job to a network printer and identifying a specific printer controller governing the print job. The method further includes loading a set of identifiers respective to a specific printer controller and selecting from the set a respective identifier corresponding to the type of print job employed on the specific printer controller. The selected identifier is used to issue the predetermined type of notification from the controller.

15 Claims, 2 Drawing Sheets

U.S. PATENT DOCUMENTS

| | | |
|---|---|---|
| 6,198,542 B1 | 3/2001 | Tabata |
| 6,213,652 B1 | 4/2001 | Suzuki et al. |
| 6,240,456 B1 * | 5/2001 | Teng et al. .................. 709/230 |
| 6,266,150 B1 * | 7/2001 | Brossman et al. .......... 358/1.15 |
| 6,275,869 B1 | 8/2001 | Sieffert et al. |
| 6,292,267 B1 | 9/2001 | Mori et al. |
| 6,310,692 B1 * | 10/2001 | Fan et al. .................. 358/1.14 |
| 6,532,491 B1 * | 3/2003 | Lakis et al. .................. 709/223 |
| 6,574,618 B2 * | 6/2003 | Eylon et al. .................... 707/1 |
| 6,748,471 B1 * | 6/2004 | Keeney et al. ............... 710/220 |
| 6,788,429 B1 * | 9/2004 | Clough et al. ............. 358/1.15 |
| 6,825,941 B1 * | 11/2004 | Nguyen et al. ............ 358/1.15 |
| 2003/0048469 A1 * | 3/2003 | Hanson ..................... 358/1.14 |

\* cited by examiner

METHOD OF MONITORING MULTIPLE CONTROLLER FAMILIES

BACKGROUND OF THE INVENTION

The present invention is directed to the field of monitoring an controlling the operational performance of computer output peripheral devices, e.g. printers.

In many offices and other commercial establishments, it is common to have more than one device connected to a network that is capable of printing. Furthermore, multiple users often have the capability to print to any of a group of multiple printing devices on a network. In a large enterprise organization, a plurality of printers often reside on the network, many of which have different manufacturers and makes. Even those printers having the same manufacturer are often created as part of different generations of product lines.

Networked printers are generally bi-directional in nature, meaning that they not only receive print jobs for printing, but they also respond with a communication that can be used to monitor printer status. Each printer product line generally includes a document monitoring utility for monitoring printer status and translating notifications and communications received from corresponding printers. The notifications received from printers are assigned a code, or an object identifier ("OID") corresponding to the status of the printer. Such status notifications include messages describing events such as "Printing," "Paper Jam," "Out of Toner," and any other type of status or notification, depending on the particular features available on a printer.

Document and printer monitoring utilities function to monitor and receive OIDs and display for a user the message corresponding to a particular OID. Unfortunately, different manufactures and products, even different lines of printers from the same manufacturer, use different OIDs to describe the same event. Furthermore, in some instances, different lines of printers use the same OID to describe completely different events. Therefore, document and printer monitoring software is product line specific in that it functions properly only when used solely with the line of printers for which it particularly corresponds. Thus, a single document monitoring utility cannot be used to correctly monitor different printer product lines.

Consequently, network administrators must use a plurality of printer monitoring utilities to track printer activity throughout a network. It would be preferable if one printer monitoring utility had the capability to simultaneously monitor the status of printers from different product lines.

SUMMARY OF THE INVENTION

In view of the difficulties and drawbacks encountered in previous-type systems, there is therefore a need for a method of monitoring printer status that is capable of simultaneously monitoring of different printer product lines.

There is also a need for a method of translating various OID notification coding schemes into a standardized OID code.

These needs and others are satisfied by the method of the present invention including the steps of submitting a print job to a network printer and identifying a specific printer controller governing the print job. The method further includes loading a set of identifiers respective to a specific printer controller and selecting from the set of identifiers a respective identifier corresponding to the type of print job employed on the specific printer controller. The selected identifier is used to issue the predetermined type of notification from the controller.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

In a preferred embodiment, a computer and multiple peripheral devices are connected to a network. The network suitably runs on any network operating system ("NOS") or mainframe system and suitably supports a myriad of software packages. Preferably the present invention is employed in a system where a user of personal computer ("PC") issues a print command. The hard copy is printed from a printer, which is suitably a multifunction peripheral ("MFP") device such as a combined copier/printer/fax device. In the preferred embodiment, the user selects the "print" command from a menu of command options, such as those used with a graphical user interface operating system. However, it should be understood that the present invention is not limited in this manner and could easily be adapted to systems employing a print function or the like, all without departing from the present invention.

Figure 1:
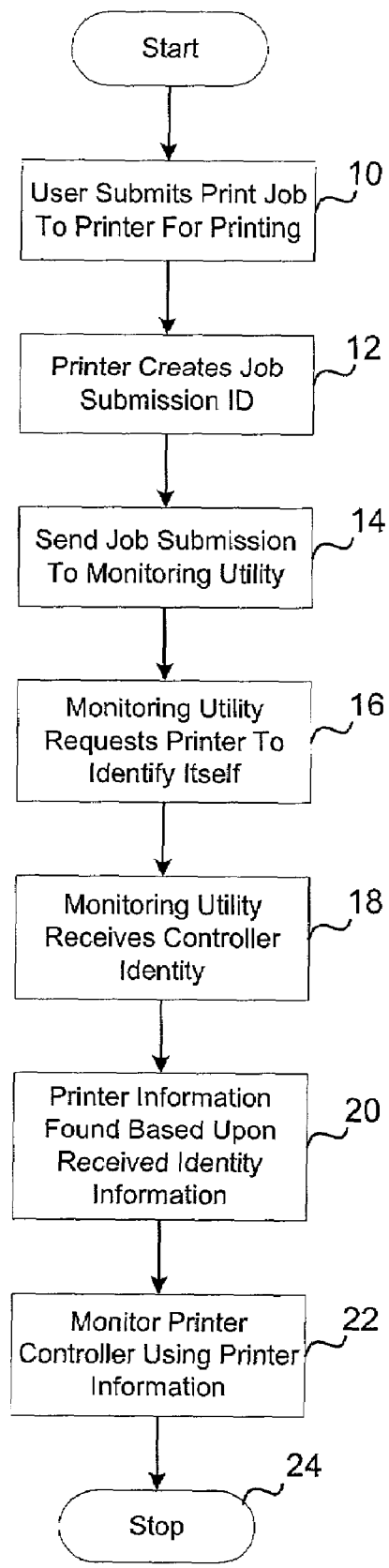
FIG. 1 is a flow chart generally depicting the steps of the method of the present invention.

Turning now to FIG. 1, a flow diagram of a method of the present invention is disclosed. The basic flow commences at start block and progress to process 10 which is suitably a manual operation wherein a user invokes a "print" command from a software program. The software program is not limited to any particular application software program, and is suitably any program such as an office suite package, a word processing package, or even the operating system itself, e.g. printing from a DOS environment. When a user invokes a print command 10, an event is triggered prompting the user to select a printer for printing. In a preferred embodiment, a printer driver activates a dialog box that pops up to enable the user to select a printer from a list of available printers.

Flow progresses to process 12 wherein the selected printer after having received the print job requests generates an OID. In a presently preferred embodiment, a printer controller generates an OID corresponding to the current printer status. After the OID is generated, it is transmitted to a printer monitoring utility in process 14. The printer monitoring utility is preferably a network utility residing on a server, but is also suitably a utility stored locally on the PC at which the user generated the print command. Upon receipt of the OID, the monitoring utility queries the printer controller to identify itself in process 16. The printer controller replies with an identity descriptor, which is suitably a header or the like, and in block 18, the monitoring utility receives this controller identity descriptor.

In process 20, after receiving the controller identity descriptor, the monitoring utility determines a method for translating the received OID based on the received identity descriptor. For example, the monitoring utility suitably searches through a database to determine the printer manufacturer, model number, family group or subgroup, or any other type of information relative to the identified printer, so as to obtain generalized information about the printer functionality. Further, the monitoring utility suitably searches for an appropriate translation mapping table for correlating the specific received OID with a status notification, such as "Paper Jam".

In process 22, the monitoring utility uses this information to monitor the printer status, so as to present status messages in a consistent, standardized format that is suitably viewed by a user or system administrator. In this manner, the monitoring utility suitably provides universal translation capability between a variety of different printer types, each having its own OID translation table. In block 24, the process is stopped.

Figure 2:
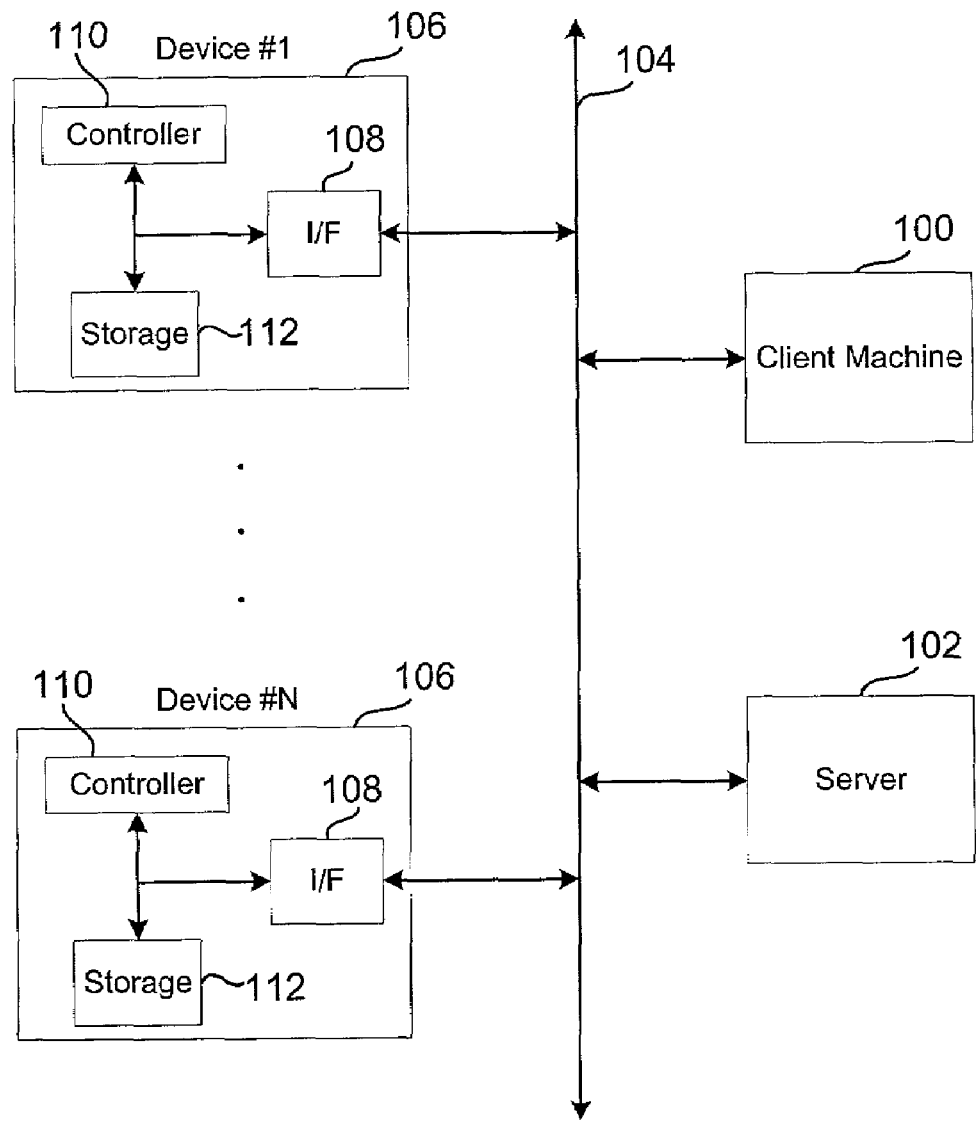
FIG. 2 is a block diagram generally indicating a network as deployed with the present invention.

An exemplary network employing the present invention is shown in FIG. 2. The network 104 is suitably any network and is suitably comprised of physical and transport layers such as illustrated by a myriad of conventional data transport mechanisms such Ethernet, Token-Ring™, 802.11(b), or other wire-based or wireless data communication mechanisms as will be apparent to one of ordinary skill in the art. The client machine 100 is suitably any type of computer, but is preferably a personal computer running an on a Windows, Unix, Macintosh, or Linux based operating system. The client machine 100 is preferably equipped with a software program, at least one printer driver, and a network connector. It should be noted that the printer driver need not be loaded onto the personal computer 100. It is within the scope of the present invention if the client machine accesses networked printer drivers located on a server 102 as opposed to local printer drivers.

The communication protocol between client and peripheral devices 106 is Simple Network Management Protocol ("SNMP"), which is capable of managing nodes on an IP network. It should be understood that SNMP is not limited to TCP/IP. SNMP is suitably used to manage and monitor all sorts of equipment including computers, routers, wiring hubs, toasters, MFPs and jukeboxes.

Any number of client machines 100 receive network software and messages from at least one server 102. All network devices are connected to the network using a network backbone 104. The network suitably includes any number N of network peripheral devices 106 including output devices. Preferably, devices 106 are printers or MFP devices. Each device 106 comprises a network interface 108, a controller 110 and a memory 112 for storage of software and various data, integral with the device.

In a presently preferred embodiment of the invention, a user invokes a "print" command. A printer driver activates a printer dialog box that pops up to enable the user to select various print options. An "OK" button on the dialog is clicked to perform a submission step for submitting a print job to a network printer. A notifying step is performed for notifying the monitoring utility of a unique job submission identification. An identifying step follows in which the monitoring utility queries the controllers to identify which specific printer controller type is used for governing the print job.

In this embodiment, the printer driver maintains a set of mapping tables that govern the operation of the identified device. These mapping tables can retain a respective set of Object Identifiers (OIDs) that correspond to each status and other types of notification messages that are issued from the particular model and version of printer controller to which the print job is sent. For example, the mapping tables may be one of two different types of mapping tables, e.g. including codes for the printer controller of an older model printer, or from a newer model. The printer controller replies to the monitoring utility's query in a reply step, where the type of mapping table is identified, e.g. as corresponding to the older or newer model printer, where similar OIDs might be used to issue different types of notification messages.

After query and reply, a loading step is performed where the set of mapping tables is loaded respective to a specific printer controller, e.g. where either an older or newer print controller model is identified. Once the loading step is performed, a selecting step is performed for selecting from the set of mapping tables a respective object identifier corresponding to a predetermined type of notification to be issued by the specific printer controller. These selected OIDs are utilized in a using step for using the selected object identifier to issue the predetermined type of notification from the controller. The notification can be displayed to the user in a displaying step, where the notification can be displayed using a pop-up dialog box, or other type of message notification such as could be employed, without departing from the present invention.

In the preferred embodiment, the mapping tables are message dynamic link libraries that are loaded and unloaded depending on the specific printer controller. Each dynamic link library is generated with its own header file for the respective object identifier. As presently disclosed, the present invention provides a method of translating the OIDs in each type of mapping table into a universal code, so as to overcome problems encountered in previous enterprise networks that may use more than one model version of a peripheral component. In so doing, the present invention provides a degree of flexibility and efficiency not obtainable with previous type systems.

As described hereinabove, the present invention solves many problems associated with previous type devices. However, it will be appreciated that various changes in the details, materials and arrangements of parts which have been herein described and illustrated in order to explain the nature of the invention may be made by those skilled in the area within the principle and scope of the invention will be expressed in the appended claims.

What we claim is:

1. A method of controller monitoring comprising:
   receiving, from an associated network device, a plurality of document processing jobs, each document processing job being directed to at least one of a plurality of dissimilar network document processing devices;
   identifying a specific controller corresponding to each document processing job;
   loading, for each document processing job, a selected set of identifiers from a plurality of sets thereof, which identifiers correspond to a specific controller corresponding thereto;
   selecting for each document processing job, from the selected set of identifiers, a respective identifier corresponding to a predetermined type of notification to be issued by each corresponding controller;
   outputting each document processing job to its corresponding controller;
   receiving job status data from each of the controllers;
   matching received job status data and corresponding selected identifier to a corresponding, predetermined uniform status notification; and
   communicating each uniform status notification to at least one user.

2. The method of claim 1 wherein the each set of identifiers includes mapping tables having message dynamic link libraries that are loaded and unloaded depending on the specific controller.

3. The method of claim 2 wherein each dynamic link library is generated with its own header file for the respective identifier.

4. The method of claim 1 wherein the step of communicating the predetermined type of uniform status notification is via a selected communication protocol.

5. The method of claim 4 wherein the selected communication protocol is simple network management protocol.

6. A controller monitoring utility for monitoring document processing functions upon submitting a document processing job to a network document processing device, the monitoring utility comprising:
   means for receiving, from an associated network device, a plurality of document processing jobs, each document processing job being directed to at least one of a plurality of dissimilar network document processing devices;
   means for identifying a specific controller corresponding to each document processing job;
   means for loading, for each document processing job, a selected set of identifiers from a plurality of sets thereof, which identifiers correspond to the specific controller;
   means for selecting from the selected set of identifiers, a respective identifier corresponding to a predetermined type of notification to be issued by each corresponding controller;
   means for outputting each document processing job to its corresponding controller;
   means for receiving job status data from each of the controllers
   means for matching received job status data and corresponding selected identifier to a corresponding predetermined type of uniform status notification; and
   means for communicating each predetermined type of uniform status notification to at least one associated user.

7. The controller monitoring utility of claim 6 wherein the each set of identifiers includes mapping tables having message dynamic link libraries that are loaded and unloaded depending on the specific controller.

8. The controller monitoring utility of claim 7 wherein each dynamic link library is generated with its own header file for the respective identifier.

9. The controller monitoring utility of claim 6 wherein means for communicating the predetermined type of uniform status notification is via a selected communication protocol.

10. The controller monitoring utility of claim 9 wherein the selected communication protocol is simple network management protocol.

11. A network comprising:
   a plurality of dissimilar network document processing devices, each network document processing device having a controller associated therewith;
   a plurality of network devices, each network device submitting a document processing job to at least one of the network document processing devices;
   a controller monitoring utility for monitoring document processing functions of each controller, the monitoring utility comprising:
   means for identifying a specific controller corresponding to each document processing job;
   means for loading, for each document processing job, a selected set of identifiers from a plurality of sets thereof, which identifiers correspond to the a controller associated therewith;
   means for selecting from each selected set of identifiers an identifier corresponding to a predetermined type of notification to be issued by the specific controller;
   means for matching each selected identifier to a corresponding predetermined type of uniform status notification; and
   means for communicating each predetermined type of uniform status notification to at least one associated user.

12. The network of claim 11 wherein the each set of identifiers includes mapping tables having message dynamic link libraries that are loaded and unloaded depending on the specific controller.

13. The network of claim 12 wherein each dynamic link library is generated with its own header file for the respective identifier.

14. The network of claim 11 wherein means for communicating the predetermined type of uniform status notification is via a selected communication protocol.

15. The network of claim 14 wherein the selected communication protocol is simple network management protocol.

* * * * *